(12) United States Patent
Minagawa

(10) Patent No.: US 8,969,427 B2
(45) Date of Patent: Mar. 3, 2015

(54) SURFACE MODIFICATION METHOD AND SURFACE-MODIFIED ELASTIC BODY

(71) Applicant: Sumitomo Rubber Industries, Ltd., Kobe-shi, Hyogo (JP)

(72) Inventor: Yasuhisa Minagawa, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 0 days.

(21) Appl. No.: 13/956,974

(22) Filed: Aug. 1, 2013

(65) Prior Publication Data

US 2014/0039084 A1 Feb. 6, 2014

(30) Foreign Application Priority Data

Aug. 2, 2012 (JP) ................................. 2012-172307

(51) Int. Cl.

| | | |
|---|---|---|
| *C08F 2/50* | (2006.01) | |
| *C08F 2/46* | (2006.01) | |
| *B29C 71/04* | (2006.01) | |
| *A61L 2/08* | (2006.01) | |
| *A61L 24/00* | (2006.01) | |
| *C08G 61/04* | (2006.01) | |
| *C08F 8/00* | (2006.01) | |
| *C08J 7/16* | (2006.01) | |
| *C08J 7/18* | (2006.01) | |
| *C08F 255/06* | (2006.01) | |
| *C08F 291/02* | (2006.01) | |
| *C08F 291/18* | (2006.01) | |
| *B29D 30/00* | (2006.01) | |
| *B29D 30/66* | (2006.01) | |
| *C08F 2/48* | (2006.01) | |
| *C08L 21/00* | (2006.01) | |

(52) U.S. Cl.
CPC ... *C08F 8/00* (2013.01); *C08J 7/16* (2013.01); *C08J 7/18* (2013.01); *C08F 255/06* (2013.01); *C08F 291/02* (2013.01); *C08F 291/18* (2013.01); *C08L 21/00* (2013.01); *B29D 30/0005* (2013.01); *B29D 30/66* (2013.01); *B29D 2030/0011* (2013.01); *B29D 2030/667* (2013.01); *C08F 2/48* (2013.01); *C08F 2810/20* (2013.01); *C08J 2311/00* (2013.01)
USPC .......... 522/46; 522/33; 522/6; 522/1; 522/71; 522/189; 522/184; 520/1

(58) Field of Classification Search
CPC ........ C08F 8/00; C08F 255/06; C08F 291/18; C08F 8/32; C08F 2810/20; C08J 7/16; C08J 2321/00; B29D 30/66; B29D 2030/67
USPC ............. 522/46, 33, 6, 71, 189, 184, 1; 520/1
See application file for complete search history.

(56) References Cited

U.S. PATENT DOCUMENTS

| | | | | |
|---|---|---|---|---|
| 3,418,066 | A * | 12/1968 | Caldwell et al. ............. | 8/115.62 |
| 5,637,460 | A * | 6/1997 | Swan et al. .................. | 435/6.11 |
| 2011/0160357 | A1* | 6/2011 | Gerster et al. .................. | 524/83 |

FOREIGN PATENT DOCUMENTS

| | | |
|---|---|---|
| JP | 2004-298220 A | 10/2004 |
| JP | 2010-142537 A | 7/2010 |

* cited by examiner

*Primary Examiner* — Ling Choi
*Assistant Examiner* — Jessica E Whiteley
(74) *Attorney, Agent, or Firm* — Birch, Stewart, Kolasch & Birch, LLP

(57) ABSTRACT

The present invention aims to provide a surface modification method for a rubber vulcanizate or a thermoplastic elastomer, which can impart excellent sliding properties and excellent durability against repeated sliding motion and can allow the surface to maintain the sealing properties, without using expensive self-lubricating plastics. The present invention relates to a surface modification method for modifying a rubber vulcanizate or a thermoplastic elastomer as an object to be modified, the method including: step 1 of forming polymerization initiation points on the object to be modified; step 2 of radically polymerizing a monomer, starting from the polymerization initiation points, by irradiation with LED light at 300 nm to 400 nm to grow polymer chains on a surface of the object to be modified; and step 3 of esterifying, transesterifying or amidating side chains of the polymer chains.

20 Claims, 2 Drawing Sheets

SURFACE MODIFICATION METHOD AND SURFACE-MODIFIED ELASTIC BODY

TECHNICAL FIELD

The present invention relates to a surface modification method, and a surface-modified elastic body, a gasket for syringes, a catheter, and a tire, each obtained by the surface modification method.

BACKGROUND ART

For parts that slide while maintaining their sealing performance, such as gaskets each of which is integrated with a syringe plunger and forms a seal between the plunger and the barrel, elastic bodies (e.g. rubber) are used focusing on sealing properties. Such elastic bodies, however, have a slight problem in their sliding properties (see Patent Literature 1). Hence, a sliding property improving agent (e.g. silicone oil) is applied to the sliding surface. It is, however, pointed out that silicone oil can negatively affect recently marketed biopreparations. On the other hand, a gasket to which a sliding property improving agent is not applied is poor in the sliding properties; therefore, the plunger cannot be pushed smoothly so that it pulsates in administration, thereby causing problems such as inaccuracy in the injection amount and infliction of pain on patients.

In order to simultaneously satisfy such conflicting requirements, that is, the sealing properties and the sliding properties, a technique is proposed in which a self-lubricating PTFE film is applied (see Patent Literature 2). The film, however, is generally expensive and thus increases the production cost of processed products, limiting its application range. Another problem is that since PTFE is vulnerable to radiation, it cannot be sterilized by radiation. Moreover, if the surface of a syringe or catheter is acidic, then the syringe may affect chemical liquids or the catheter may affect the inner body environment such as proteins. Hence, the surface is preferably neutral, bipolar, or hydrophobic.

Furthermore, application to other uses requiring sliding properties in the presence of water may be considered. Specifically, water can be delivered without a loss by reducing the fluid resistance of the inner surface of a pre-filled syringe or the inner surface of a pipe or tube for delivering water, or by making its contact angle with water large or greatly small. Also, drainage of water on wet roads and of snow on snowy roads can be improved by reducing the fluid resistance of the groove surface of tires, or by making its contact angle with water large or greatly small. This results in enhanced hydroplaning resistance and enhanced grip performance, leading to better safety. In addition, less sticking of wastes and dusts can be expected as a result of reducing the sliding resistance of the sidewall surface of tires or walls of buildings, or as a result of making its or their contact angle with water large.

Further advantageous effects can be expected, such as: less pressure loss when water, an aqueous solution or the like is delivered through a diaphragm such as a diaphragm pump or a diaphragm valve; easy sliding of skis or a snowboard by enhancing the sliding properties of the sliding surface thereof; better noticeability of a road sign or a signboard by enhancing the sliding properties thereof to allow snow to slide easily; reduction in water resistance or drag and less sticking of bacteria on the outer peripheries of a ship by reducing the sliding resistance of the outer peripheries or by making their contact angle with water large; and swimsuits with reduced water resistance or drag by improving the sliding properties of the thread surface thereof.

CITATION LIST

Patent Literature

Patent Literature 1: JP 2004-298220 A
Patent Literature 2: JP 2010-142537 A

SUMMARY OF INVENTION

Technical Problem

The present invention aims to solve the above problems and provide a surface modification method for a rubber vulcanizate or a thermoplastic elastomer, which can impart excellent sliding properties and excellent durability against repeated sliding motion and can allow the surface to maintain the sealing properties, without using expensive self-lubricating plastics. The present invention also aims to provide surface-modified elastic bodies, gaskets for syringes, catheters, and tires, which are obtained by the surface modification method.

Solution to Problem

The present invention relates to a surface modification method for modifying a rubber vulcanizate or a thermoplastic elastomer as an object to be modified, the method including:
step 1 of forming polymerization initiation points on the object to be modified;
step 2 of radically polymerizing a monomer, starting from the polymerization initiator points, by irradiation with LED light at 300 nm to 400 nm to grow polymer chains on the surface of the object to be modified; and
step 3 of esterifying, transesterifying or amidating side chains of the polymer chains.

Preferably, the step 1 is a step of allowing a polymerization initiator to be adsorbed on the object to be modified.

Preferably, the step 1 is a step of allowing a polymerization initiator to be adsorbed on the object to be modified, and then fixing the polymerization initiator on a surface of the object by use of LED light at 300 nm to 400 nm.

The rubber vulcanizate or thermoplastic elastomer preferably contains an allylic carbon atom which is a carbon atom adjacent to a double bond.

The polymerization initiator is preferably at least one of a benzophenone compound and a thioxanthone compound.

The step 2 is preferably a step of radically polymerizing a monomer, starting from the polymerization initiation points, in the presence of a reducing agent or an antioxidant by irradiation with LED light at 300 nm to 400 nm to grow polymer chains on a surface of the object to be modified. The reducing agent or antioxidant is preferably at lease one selected from the group consisting of riboflavin, ascorbic acid, α-tocopherol, β-carotene, and uric acid.

Preferably, during or before the light irradiation, an inert gas is inserted into a reaction container and a reaction solution so that polymerization is performed in an atmosphere replaced with the inert gas, or vacuuming is conducted so that polymerization is performed in a system free from oxygen.

A compound to be used for the esterification or transesterification is preferably at least one selected from the group consisting of alkyl alcohols, alkoxy alcohols, aromatic alcohols, and fluoro alcohols.

A compound to be used for the amidation is preferably at least one selected from the group consisting of alkylamines, aromatic amines, fluoroamines, and amino group-containing silane compounds.

The monomer is preferably at least one of an acrylic acid and a methacrylic acid.

Preferably, the (liquid) monomer or a solution thereof contains a polymerization inhibitor, and the monomer is polymerized in the presence of the polymerization inhibitor.

The polymerization inhibitor is preferably 4-methylphenol.

The polymer chains are preferably 10 nm to 50000 nm in length.

The present invention relates to a surface-modified elastic body, which is obtained by the aforementioned surface modification method.

The present invention relates to a surface-modified elastic body, which is required to have sliding properties in the presence of water or in a dry state, or have low friction in the presence of water or in a dry state, or have low water resistance in the presence of water or in a dry state, and which is obtained by the aforementioned surface modification method.

The present invention relates to a surface-modified elastic body, which is a three-dimensional solid having at least partially a surface modified by the aforementioned surface modification method.

The surface-modified elastic body is preferably a polymer brush.

The present invention also relates to a gasket for syringes, which has at least partially a surface modified by the aforementioned surface modification method.

The present invention also relates to a catheter, which has at least partially a surface modified by the aforementioned surface modification method.

The present invention also relates to a tire, which has at least partially a groove surface modified by the aforementioned surface modification method.

Advantageous Effects of Invention

The present invention provides a surface modification method for modifying a rubber vulcanizate or a thermoplastic elastomer as an object to be modified, the method including:
  step 1 of forming polymerization initiation points on the object to be modified;
  step 2 of radically polymerizing a monomer, starting from the polymerization initiation points, by irradiation with LED light at 300 nm to 400 nm to grow polymer chains on a surface of the object to be modified; and
  step 3 of esterifying, transesterifying or amidating side chains of the polymer chains. Accordingly, it is possible to impart excellent sliding properties and excellent durability against repeated sliding motion to the surface of the object to be modified and also provide favorable sealing properties. Thus, when the method is used to form polymer chains on the surface of the object to be modified, surface-modified elastic bodies (e.g. gaskets for syringes) which are excellent in the aforementioned performances can be provided. Moreover, since the surface-modified elastic bodies do not have a PTFE polymer structure, they can be sterilized by radiation such as gamma rays. Furthermore, since those containing a phosphorine group, a perfluoroalkyl group, an ethylene glycol group, a perfluoroethylene glycol group, or an alkozysilyl group in a side chain have bicompatibility, they can prevent adscription and aggregation of proteins in bio-preparations.

DESCRIPTION OF EMBODIMENTS

Figure 1:
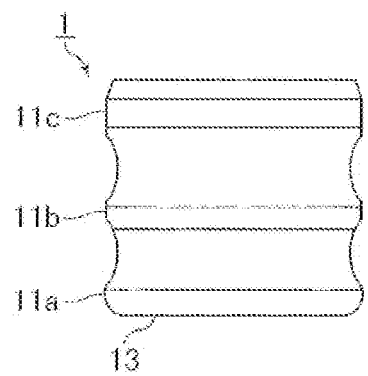
FIG. 1 is a side view of one embodiment of the gasket for syringes.

The surface modification method according to the present invention is a surface modification method for modifying a thermoplastic elastomer or a rubber vulcanizate as an object to be modified, the method including:
  step 1 of forming polymerization initiation points on the object to be modified;
  step 2 of radically polymerizing a monomer, starting from the polymerization initiation points, by irradiation with LED light at 300 nm to 400 nm to grow polymer chains on a surface of the object to be modified; and
  step 3 of esterifying, transesterifying or amidating side chains of the polymer chains.

In the step 1, polymerization initiation points are formed on the surface of a vulcanization-molded rubber or a molded thermoplastic elastomer (object to be modified).

Preferred examples of the rubber vulcanizate and the thermoplastic elastomer include those containing a carbon atom adjacent to a double bond (allylic carbon atom).

Examples of the rubber for the object to be modified include diene rubbers such as styrene-butadiene rubber, butadiene rubber, isoprene rubber, natural rubber, and deproteinized natural rubber; and butyl rubber and halogenated butyl rubber which have a degree of unsaturation of a few percent of isoprene units. In the case of the butyl rubber or halogenated butyl rubber, rubber cross-linked by triazine is preferred because the amount of matter extracted from the rubber vulcanizate is small. In this case, the rubber may contain an acid acceptor, and examples of suitable acid acceptors include hydrotalcites and magnesium carbonate.

In the case of other rubbers, sulfur vulcanization is preferred. In such a case, compounding agents commonly used for sulfur vulcanization may be added, such as vulcanization accelerators, zinc oxide, fillers, and silane coupling agents. Preferred examples of the fillers include carbon black, silica, clay, talc, and calcium carbonate.

The vulcanization conditions for rubber may be appropriately set. The vulcanization temperature for rubber is preferably 150° C. or higher, more preferably 170° C. or higher, and further preferably 175° C. or higher.

Examples of the thermoplastic elastomer include polymer compounds having rubber elasticity at room temperature owing to the aggregates of plastic components (hard segments) that serve as crosslinking points (e.g. thermoplastic elastomers (TPE) such as styrene-butadiene-styrene copolymers); and polymer compounds having rubber elasticity, obtained by mixing a thermoplastic component and a rubber component and dynamically crosslinking the mixture by a crosslinking agent (e.g. thermoplastic elastomers (TPV) such as polymer alloys containing a styrenic block copolymer or olefinic resin together with a crosslinked rubber component).

Other suitable examples of the thermoplastic elastomer include nylon, polyester, polyurethane, polypropylene, and dynamically crosslinked thermoplastic elastomers thereof. In the case of using dynamically crosslinked thermoplastic elastomers, preferred examples thereof include those obtained by dynamically crosslinking halogenated butyl rubber in a thermoplastic elastomer. Here, the thermoplastic elastomer may preferably be nylon, polyurethane, polypropylene, or SIBS (styrene-isobutylene-styrene block copolymer), for example.

Polymerization initiation points can be formed, for example, by adsorption of a polymerization initiator on the surface of the object to be modified. Examples of the polymerization initiator include carbonyl compounds, organic sulfur compounds (e.g. tetraethylthiuram disulfide), persulfides, redox compounds, azo compounds, diazo compounds, halogen compounds, and photoreductive pigments. Preferred among these are carbonyl compounds.

The carbonyl compound as a polymerization initiator is preferably benzophenone or its derivative, and suitable examples thereof include benzophenone compounds represented by the following formula (1):

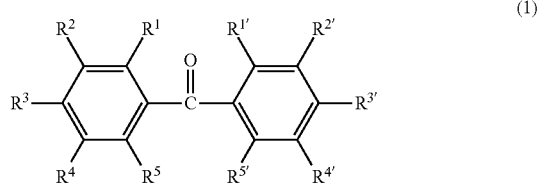

(1)

wherein $R^1$ to $R^5$ and $R^{1'}$ to $R^{5'}$ are the same as or different from one another and each represent a hydrogen atom, an alkyl group, a halogen (fluorine, chlorine, bromine, or iodine), a hydroxy group, a primary, secondary or tertiary amino group, a mercapto group, or a hydrocarbon group that may contain an oxygen atom, a nitrogen atom or a sulfur atom; and any two adjacent groups thereof may be joined to each other to form a cyclic structure together with the carbon atoms to which they are bonded.

Specific examples of the benzophenone compounds include benzophenone, xanthone, 9-fluorenone, 2,4-dichlorobenzophenone, methyl o-benzoylbenzoate, 4,4'-bis(dimethylamino)benzophenone, and 4,4'-bis(diethylamino)benzophenone. Particularly preferred among these are benzophenone, xanthone, and 9-fluorenone because they contribute to favorable polymer brushes.

Thioxanthone compounds can also be suitably used as the polymerization initiator because they allow for a high polymerization rate, and can easily be adsorbed on and/or reacted with rubber or the like. For example, compounds represented by the following formula (2) can be suitably used:

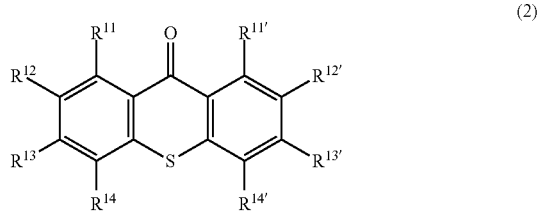

(2)

wherein $R^{11}$ to $R^{14}$ and $R^{11'}$ to $R^{14'}$ are the same as or different from one another and each represent a hydrogen atom, a halogen atom, an alkyl group, a cyclic alkyl group, an aryl group, an alkenyl group, an alkozy group, or an aryloxy group.

Examples of the thioxanthone compounds represented by the formula (2) include thioxanthone, 2-isopropylthioxanthone, 4-isopropylthioxanthone, 2,3-diethylthioxanthone, 2,4-diethylthioxanthone, 2,4-dichlorothioxanthone, 2-methoxythioxanthone, 1-chloro-4-propoxythioxanthone, 2-cyclohexylthioxanthone, 4-cyclohexylthioxanthone, 2-vinylthioxanthone, 2,4-divinylthioxanthone, 2,4-diphenylthioxanthone, 2-butenyl-4-phenylthioxanthone, 2-methoxythioxanthone, and 2-p-octyloxyphenyl-4-ethylthioxanthone. Preferred among these are the compounds in which one or two, particularly two of the $R^{11}$ to $R^{14}$ and $R^{11'}$ to $R^{14'}$ are substituted with alkyl groups, and more preferred is 2,4-diethylthioxanthone.

The adsorption of a polymerization initiator (e.g. benzophenone compounds, thioxanthone compounds) on the surface of the object to be modified may be carried out according to a known method. In the case of using a benzophenone compound or a thioxanthone compound, for example, the benzophenone compound or the thioxanthone compound is dissolved in an organic solvent to prepare a solution; a surface portion of the object to be modified is treated with this solution so that the compound is adsorbed on the surface portion; and if necessary, the organic solvent is dried to be evaporated off, whereby polymerization initiation points are formed. The surface-treating method is not particularly limited as long as the solution of the benzophenone compound or thioxanthone compound can be brought into contact with the surface of the object to be modified. Suitable examples thereof include application of the benzophenone or thioxanthone compound solution, spraying thereof, and immersion of the surface into the solution. If only a part of the surface needs to be modified, it is sufficient to adsorb the polymerization initiator only on such a part of the surface. In this case, for example, application of the solution or spraying of the solution is suitable. Examples of the solvent include methanol, ethanol, acetone, benzene, toluene, methyl ethyl ketone, ethyl acetate, and THF. Acetone is preferred because it does not swell the object to be modified and it is rapidly dried and evaporated off.

Preferably, after the target region to be modified is surface-treated with the benzophenone or thioxanthone compound solution so that the polymerization initiator is adsorbed, the polymerization initiator is further chemically bonded onto the surface of the object to be modified by irradiation with light. For example, the benzophenone compound or thioxanthone compound can be fixed on the surface by irradiation with LED light having a wavelength of 300 to 400 nm (preferably 350 to 400 nm). During the fixing in the step 1 or the light irradiation in the step 2, in the case of using benzophenone, for example, the benzophenone abstracts hydrogen from the rubber surface, and a carbon atom on the rubber surface is then covalently bonded to the carbon in C=O of benzophenone, while the abstracted hydrogen is bonded to the oxygen in C=O to form C—O—H. Moreover, since the hydrogen abstraction reaction selectively occurs on allylic hydrogen atoms in the object to be modified, the rubber preferably contains a butadiene or isoprene unit that contains an allylic hydrogen atom.

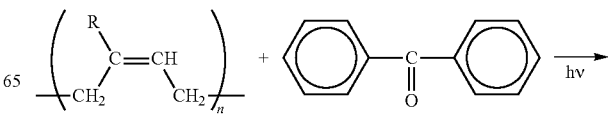

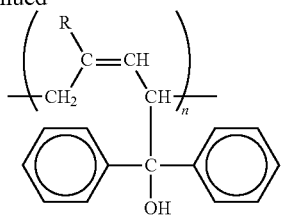

R: hydrogen or C1-C4 alkyl group

In the step 2, radical polymerization of a monomer is initiated from the polymerization initiation points formed in the step 1, to grow polymer chains on the surface of the object to be modified.

Examples of the monomer include carboxyl group-containing polymerizable monomers, and preferred among these are acrylic acid and methacrylic acid. Each of the monomers may be used alone, or two or more thereof may be used in combination.

An example of the method of radically polymerizing a monomer (radically polymerizable monomer) in the step 2 is as follows. First, a (liquid) radically polymerizable monomer or a solution thereof is applied (sprayed) to the surface of the object to be modified on which a benzophenone compound, a thioxanthone compound or the like is adsorbed or covalently bound, or the object to be modified is immersed into a (liquid) radically polymerizable monomer or a solution thereof. Then, irradiation with LED light at 300 to 400 nm is performed so that radical polymerization (photoradical polymerization) of the monomer proceeds, whereby polymer chains are grown on the surface of the object to be modified. Alternatively, after the above application, the surface of the object to be modified may be covered with transparent glass, PET, polycarbonate of the like, followed by irradiation of the covered surface with LED light at 300 to 400 nm so that radical polymerization (photoradical polymerization) of the monomer proceeds, whereby polymer chains are grown on the surface of the object to be modified.

In the step 2, radical polymerization (photoradical polymerization) is preferably allowed to proceed by irradiating a radically polymerizable monomer in the presence of a reducing agent or an antioxidant with LED light at 300 to 400 nm. This arrangement is preferred because the reducing agent or antioxidant scavenges oxygen in the system. The radically polymerizable monomer and the reducing agent or antioxidant added thereto may be mixed with or separated from each other. Moreover, the object to be modified obtained in the step 1 is brought into contact with the radically polymerizable monomer in advance before the reducing agent or antioxidant is added thereto. Alternatively, these components may be mixed in advance before the mixed material is brought into contact with the object to be modified.

Specifically, the radical polymerization may be performed as follows. For example, the object to be modified obtained in the step 1, on the surface of which polymerization initiation points are formed, is brought into contact (e.g. immersion, application) with a mixture of a (liquid) radically polymerizable monomer or a solution thereof and a solution of a reducing agent or an antioxidant, followed by the LED light irradiation. Alternatively, the object to be modified is brought into contact with a (liquid) radically polymerizable monomer or a solution thereof, and then a solution of a reducing agent or an antioxidant is put on the resulting surface, followed by the LED light irradiation.

The reducing agent and the antioxidant are not particularly limited, and compounds having a reduction or antioxidant action can be appropriately used. Preferred among these are riboflavin, ascorbic acid, α-tocopherol, β-carotene, and uric acid because of their high oxygen scavenging capability, and particularly preferred are riboflavin and ascorbic acid.

In the case of using a solution of a reducing agent or an antioxidant, the concentration of the reducing agent or antioxidant is preferable $10^{-4}$ to 1% by mass, and more preferably $10^{-3}$ to 0.1% by mass.

The amount of the radically polymerizable monomer may be appropriately set depending on, for example, a desired length of polymer chains to be formed and desired performance to be achieved by the chains. Also, the amount of the reducing agent or antioxidant may be appropriately set from the viewpoint of the oxygen scavenging capability in the system, for example.

Conventionally known materials and methods may be used for the solvent to be applied (sprayed), the method for application (spraying), the method for immersion, the conditions for irradiation, and the like. The solution of a radically polymerizable monomer may be an aqueous solution or a solution prepared by dissolving the monomer in an organic solvent that does not dissolve a polymerization initiator to be used. Furthermore, the (liquid) radically polymerizable monomer or a solution thereof may contain a known polymerization inhibitor such as 4-methylphenol.

In the present invention, radical polymerization is allowed to proceed by LED light irradiation after the (liquid) monomer or a solution thereof is applied to the object to be modified, or after the object to be modified is immersed in the (liquid) monomer or a solution thereof. The light dose may be appropriately adjusted in consideration of the polymerization time and uniform progress of the reaction. In order to prevent polymerization inhibition due to active gas such as oxygen in a reaction container, preferably oxygen is removed from the reaction container and the reaction solution during or before the light irradiation. Thus, for example, some methods may appropriately be employed in which inert gas such as nitrogen gas or argon gas is inserted into the reaction container and the reaction solution to discharge active gas such as oxygen from the reaction system to replace the atmosphere in the reaction system with the inert gas or, alternatively, vacuuming is conducted to remove oxygen from the system. Moreover, in order to prevent reaction inhibition due to oxygen or the like, for example, some measures may appropriately be used in which an LED light source is placed such that no air layer (oxygen content: 15% or higher) exists between the reaction container made of glass, plastics or the like and the reaction solution or the object to be modified.

For the LED light irradiation, the wavelength of LED light is at 300 to 400 nm, preferably 355 to 380 nm. This enables the polymer chains to be favorably formed on the surface of the object to be modified. The light source may be an LED with a center wavelength of 365 nm, an LED with a center wavelength of 375 nm, or the like. Especially, in terms of efficiency, the light source is preferably, for example, an LED with a center wavelength of 365 nm which is close to the excitation wavelength (366 nm) of benzophenone.

The length of the polymer chains formed in the step 2 is preferably 10 nm to 50000 nm, and more preferably 100 to 50000 nm. Chains shorter than 10 nm are unlikely to provide good sliding properties. Chains longer than 50000 nm are unlikely to be expected to provide better sliding properties, while they are likely to increase the cost of raw materials. In addition, a surface pattern formed by the surface treatment is likely to be visible to the naked eye, which tends to damage the appearance and to decrease the sealing properties.

In the step 2, two or more species of monomers may be radically polymerized starting from the polymerization initiation points. Moreover, multiple kinds of polymer chains may be grown on the surface of the object to be modified. The surface modification method of the present invention may include cross-linking between polymer chains. In this case, ionic cross-linking, cross-linking by a hydrophilic group containing an oxygen atom, or cross-linking by a compound containing a halogen group (e.g. iodine), may be carried out between the polymer chains.

In the step 3, side chains of the polymer chains formed in the step 2 are esterified, transesterified or amidated. This process enables to sufficiently provide the effect of the present invention.

Specifically, for example, an ester bond or an amide bond is formed in a side chain by subjecting a carboxyl group in a side chain of a polymer chain formed by polymerization of a carboxyl group-containing polymerizable monomer (e.g. acrylic acid, methacrylic acid) to esterification or transesterification with a hydroxy group of an alcohol, or amidation with an amino group of an amine compound.

Examples of the compound to be used for esterification or transesterification include known alcohols such as linear, branched or cyclic alkyl alcohols or alkoxy alcohols, aromatic alcohols, and fluoro alcohols. The alkyl alcohol preferably has 3 to 25 carbon atoms. The alkoxy alcohol preferably has 2 to 10 carbon atoms. The aromatic alcohol preferably has 6 to 10 carbon atoms. The fluoro alcohol preferably has 1 to 6 carbon atoms. Preferred among these are linear, branched or cyclic alkyl alcohols or alkoxy alcohols, and more preferred are linear alkyl alcohols or alkoxy alcohols.

Examples of the alkyl alcohols include pentanol, hexanol, heptanol, octanol, nonanol, decanol, dodecanol, hexadecanol, octadecanol, eicosanol, and docosanol. Examples of the alkoxy alcohols include methoxyethanol and ethoxyethanol. Examples of the aromatic alcohols include benzyl alcohol, and 2-benzyloxyethanol. Examples of the fluoro alcohols include perfluoroalcohols such as perfluoroethanol; 2-fluoroethanol; and 2,2,2-trifluoroethanol. Each of these may used alone, or two or more of these may be used in combination.

Examples of the compound to be used for amidation include known amine compounds such as linear, branched or cyclic alkylamines, aromatic amines, fluoroamines, and amino group-containing silane compounds. The alkylamine preferably has 3 to 25 carbon atoms. The aromatic amine preferably has 6 to 10 carbon atoms. The fluoroamine preferably has 1 to 6 carbon atoms. The amino group-containing silane compound preferably has 2 to 10 carbon atoms. Preferred among these are linear, branched or cyclic alkylamines, fluoroamines, and amino group-containing silane compounds. More preferred are linear alkylamines, fluoroamines, and aminoalkylalkoxysilanes.

Examples of the alkylamines include ethylamine, propylamine, butylamine, pentylamine, hexylamine, heptylamine, and octylamine. Examples of the aromatic amines include piperidine and pyridine. Examples of the fluoroamines include heptafluorobutylamine, tridecafluoroheptylamine, and pentadecafluoroctylamine. Examples of the amino group-containing silane compounds include aminoalkylalkoxysilanes such as aminopropyltrimethoxysilane, aminopropyltriethoxysilane, aminopropylmethyldiethoxysilane, and aminopropylmethyldimethoxysilane. Each of these may be used alone, or two or more of these may be used in combination.

The esterification, transesterification, and amidation in the step 3 may be carried out by known methods. These reactions may be allowed to proceed, for example, in the presence of acid.

Treatment of a rubber vulcanizate or a thermoplastic elastomer by the surface modification method enables to provide a surface-modified elastic body. The obtained surface-modified elastic body is excellent in sliding properties in the presence of water or in a dry state. The surface-modified elastic body is also excellent in that it has low friction and low water resistance or drag. Moreover, treatment of at least part of a three-dimensional solid (e.g. elastic body) by the method enables to provide a surface-modified elastic body having better quality. Preferred examples of such a surface-modified elastic body include polymer brushes. The polymer brush herein means an assembly of graft polymer chains obtained by the "grafting from" approach by surface-initiated living radical polymerization. The graft chains are preferably oriented in a direction substantially vertical to the surface of the object to be modified because, in such a case, the entropy is reduced and the molecular mobility of the graft chains is reduced, which ensures sliding properties. Preferred are semidilute brushes and concentrated brushes which have a brush density of 0.01 chains/nm$^2$ or higher.

Furthermore, treatment of a rubber vulcanizate or a thermoplastic elastomer by the surface modification method enables to produce a gasket for syringes which has at least partially a modified surface. The modification is preferably performed at least on the sliding portion of the gasket surface, or may be performed on the entire surface.

FIG. 1 is a side view of an embodiment of the gasket for syringes. A gasket 1 shown in FIG. 1 has three circular protruding portions 11a, 11b, and 11c, each of which continuously protrudes along the circumferential direction on the outer periphery that is to be in contact with the inner periphery of a syringe barrel. Examples of the portion of the gasket 1 to which the surface modification is applied include: (1) the surfaces of protruding portions to be in contact with a syringe barrel, such as the circular protruding portions 11a, 11b, and 11c; (2) the entire side surface including the circular protruding portions 11a, 11b, and 11c; and (3) the entire side surface and a bottom surface 13.

Similarly, treatment of a rubber vulcanizate or a thermoplastic elastomer by the surface modification method enables to produce a catheter having at least partially a modified surface. The modification is preferably performed at least on a part contacting a biological fluid, such as the surface of a catheter, or the modification may be performed on the entire surface.

Furthermore, when grooves formed in the tread of a tire for use on vehicles such as passenger cars are treated by the surface modification method to form a polymer brush on the grooves, the fluid resistance of the groove surface on wet or snowy roads is reduced, and the contact angle with water is increased. Thus, the abilities to remove and drain water or snow are enhanced so that the hydroplaning resistance and the grip performance can be improved.

Figure 2:
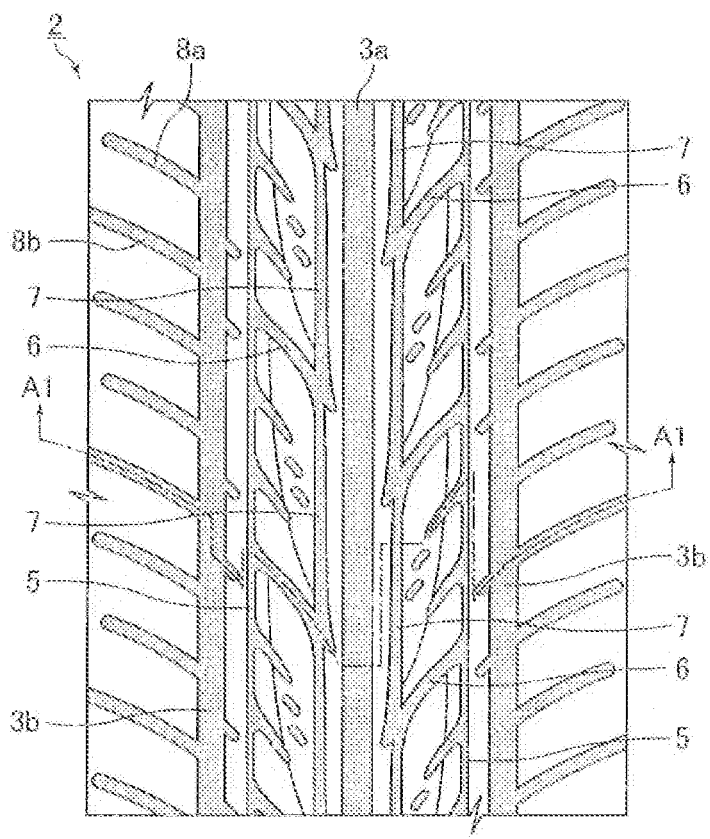
FIG. 2 is a development view of the tread portion of an exemplary pneumatic tire (the whole tire is not illustrated).
Figure 3:
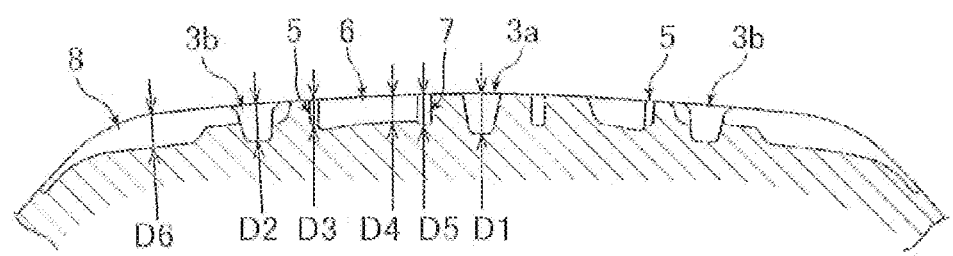
FIG. 3 is a cross-sectional view of the example of FIG. 2.

FIG. 2 is a development view of a tread portion 2 of an exemplary pneumatic tire (the whole tire is not illustrated). FIG. 3 is an A1-A1 cross-sectional view of FIG. 2.

In FIGS. 2 and 3, a longitudinal center groove 3a (groove depth D1) and longitudinal shoulder grooves 3b (groove depth D2) are straight grooves straightforwardly extending in the tire circumferential direction. Such straight grooves can contribute to low drainage resistance and high drainage performance upon straight running.

The pneumatic tire also has fine grooves 5 (groove depth D3) extending in the tire circumferential direction on the side of the longitudinal shoulder groove 3b; beveled intermediate grooves 6 (groove depth D4) extending with an inclination from the fine groove 5 toward the longitudinal center groove 3a; connecting grooves 7 (groove depth D5) located at positions inner than the fine grooves 5 in the tire axis direction and connecting the beveled intermediate grooves 6 next to one another in the tire circumferential direction; and lateral shoulder grooves 8, 8a and 8b (groove depth D6) extending from the longitudinal shoulder groove 3b toward the outside of the tire; and the like, and these grooves may also contribute to drainage performance. Treatment of these grooves by the above method enables to achieve the aforementioned effects.

EXAMPLES

The following will describe the present invention in more detail based on, though not limited to, examples.

Example 1

A chlorobutyl rubber (degree of unsaturation: 1 to 2%) having isoprene units was cross-linked by triazine to give a rubber vulcanizate (vulcanized at 180° C. for 10 minutes). The rubber vulcanizate was immersed in benzophenone (3 wt %) in acetone so that benzophenone was adsorbed onto the surface of the rubber vulcanizate. Then, the rubber vulcanizate was taken out and dried. Thereafter, the surface of the rubber vulcanizate was irradiated using an LED light source with a wavelength of 365 nm for 30 minutes to fix benzophenone. Then, the surface was washed in acetone to remove unreacted benzophenone.

The dried rubber vulcanizate was immersed in an aqueous acrylic acid solution in a glass reaction container, and was irradiated with ultraviolet rays using an LED light source with a wavelength of 365 nm for 30 minutes to cause radical polymerization so that polymer chains were grown on the rubber surface. In this manner, a product on which polymer chains were formed was obtained.

The product on which polymer chains were formed was immersed in a solution of triethylamine (0.5 g), dimethylaminopyridine (0.017 g), and 2-methyl-6-nitrobenzoic anhydride (0.63 g) in dichloromethane (15 ml) for 10 minutes.

Thereafter, the product on which polymer chains were formed was taken out of the solution and dried. The dried product was immersed in 1-hexanol in acetone for 10 hours to subject the COOH group of the acrylic acid unit to transesterification to introduce an alkyl group. In this manner, a surface-modified elastic body (polymer brush) was prepared.

Example 2

A surface-modified elastic body was prepared in the same manner as in Example 1, except that the product on which polymer chains were formed was immersed in 1-hexadecanol in acetone instead of the 1-hexanol in acetone.

Example 3

A surface-modified elastic body was prepared in the same manner as in Example 1, except that the product on which polymer chains were formed was immersed in 1-docosanol in dichloromethane instead of the 1-hexanol in acetone.

Example 4

A surface-modified elastic body was prepared in the same manner as in Example 1, except that the product on which polymer chains were formed was immersed in 2-methoxyethanol in acetone instead of the 1-hexanol in acetone.

Example 5

A chlorobutyl rubber (degree of unsaturation: 1 to 2%) having isoprene units was cross-linked by triazine to give a rubber vulcanizate (vulcanized at 180° C. for 10 minutes). The rubber vulcanizate was immersed in benzophenone (3 wt %) in acetone so that benzophenone was adsorbed onto the surface of the rubber vulcanizate. Then, the rubber vulcanizate was taken out and dried. Thereafter, the surface of the rubber vulcanizate was irradiated using an LED light source with a wavelength of 365 nm for 30 minutes to fix benzophenone. Then, the surface was washed in acetone to remove unreacted benzophenone.

The dried rubber vulcanizate was immersed in an aqueous acrylic acid solution in a glass reaction container, and was irradiated with ultraviolet rays using an LED light source with a wavelength of 365 nm for 30 minutes to cause radical polymerization so that polymer chains were grown on the rubber surface. In this manner, a product on which polymer chains were formed was obtained.

The product on which polymer chains were formed was immersed in WSC (100 mM)/NHS (50 mM) in MES buffer. Thereafter, the product on which polymer chains were formed was taken out of the solution and immersed in 2,2,3,3,4,4,4-heptafluorobutylamine in DMSO for 24 hours for amidation. In this manner, a surface-modified elastic body was prepared.

Example 6

A surface-modified elastic body was prepared in the same manner as in Example 5, except that the product on which polymer chains were formed was immersed in an aqueous butylamine solution instead of the 2,2,3,3,4,4,4-heptafluorobutylamine in DMSO.

Example 7

A surface-modified elastic body was prepared in the same manner as in Example 5, except that the product on which polymer chains were formed was immersed in 3-aminopropyltriethoxysilane in ethanol instead of the 2,2,3,3,4,4,4-heptafluorobutylamine in DMSO.

Comparative Example 1

A rubber vulcanizate (vulcanized at 180° C. for 10 minutes) prepared by cross-linking a chlorobutyl rubber by triazine was used.

The surface-modified elastic bodies prepared in the examples and the comparative example were evaluated by the following methods.

(Length of Polymer Chains)

The length of polymer chains formed on the surface of the rubber vulcanizate was measured on a cross section of the modified rubber vulcanizate with polymer chains formed thereon, using an SEM at an accelerating voltage of 15 kV and a magnification of 1000 times. The thickness of a polymer layer measured on photographs was regarded as the length of polymer chains.

(Friction Resistance)

The friction resistance of the surface of the surface-modified elastic body was measured as follows. A gasket made of the rubber vulcanizate prepared in each of the examples and comparative example was inserted into a COP resin barrel of a syringe and further pressed (pressing rate: 30 mm/min) into the barrel using a tensile tester while the friction resistance was measured. Based on the equation shown below, the friction resistance of each gasket was expressed as an index (friction resistance index) relative to the friction resistance of Comparative Example 1 regarded as 100. A smaller index indicates a lower friction resistance.

(Friction resistance index)=(friction resistance of Each example)/(friction resistance of Comparative Example 1)×100

TABLE 1

|  | Example 1 | Example 2 | Example 3 | Example 4 | Example 5 | Example 7 | Example 7 | Comparative Example 1 |
|---|---|---|---|---|---|---|---|---|
| Length of polymer chains (nm) | 3200 | 3150 | 3200 | 3100 | 3250 | 3150 | 3250 | — |
| Friction resistance index | 10.2 | 6.7 | 5.4 | 14.1 | 4.8 | 5.6 | 5.1 | 100 |

The results show that the surfaces of the surface-modified elastic bodies prepared in the examples had greatly reduced friction resistance indices and therefore good sliding properties. Moreover, as the surfaces were modified with an alkyl group, a fluoroalkyl group or the like, the sealing properties with respect to chemical liquids were similar to that in Comparative Example 1.

Thus, in the case that the present invention is applied to gaskets for syringe plungers, sufficient sealing properties are achieved while the friction of the plunger with the syringe barrel is reduced. Consequently, operations using such a syringe can be easily and accurately performed. Moreover, since the difference between the coefficient of static friction and the coefficient of dynamic friction is small, the beginning of pressing the plunger and the subsequent entry of the plunger can be smoothly accomplished without pulsation. Furthermore, in the case that a syringe barrel is formed from a thermoplastic elastomer, and polymer chains are formed on its inner surface, operations using the syringe can be easily performed as mentioned above.

Also in the case of applying the present invention to a catheter, favorable sliding properties can be achieved.

Furthermore, the effects mentioned earlier can be expected when polymer chains are formed on the surfaces of grooves in treads and sidewalls of tires for vehicles such as passenger cars, or on the surfaces of diaphragms, or on the sliding surfaces of skis and snowboards, or on the surfaces of swimsuits, road signs, sign boards, and the like.

REFERENCE SIGNS LIST

1: gasket
11a, 11b, 11c: circular protruding portion
13: bottom surface
2: tread portion
3a: longitudinal center groove
3b: longitudinal shoulder groove
5: fine groove
6: beveled intermediate groove
7: connecting groove
8, 8a, 8b; lateral shoulder groove

The invention claimed is:

1. A surface modification method for modifying a rubber vulcanizate or a thermoplastic elastomer as an object to be modified, wherein the rubber vulcanizate or thermoplastic elastomer contains an allylic carbon atom which is a carbon atom adjacent to a double bond, the method comprising:

step 1 of forming polymerization initiation points on the object to be modified;

step 2 of radically polymerizing a monomer, starting from the polymerization initiation points, by irradiation with LED light at 300 nm to 400 nm to grow polymer chains on a surface of the object to be modified; and step 3 of esterifying, transesterifying or amidating side chains of the polymer chains.

2. The surface modification method according to claim 1, wherein the step 1 comprises allowing a polymerization initiator to be adsorbed on the object to be modified.

3. The surface modification method according to claim 1, wherein the step 1 comprises allowing a polymerization initiator to be adsorbed on the object to be modified, and then fixing the polymerization initiator on a surface of the object by use of LED light at 300 nm to 400 nm.

4. The surface modification method according to claim 2, wherein the polymerization initiator is at least one of a benzophenone compound and a thioxanthone compound.

5. The surface modification method according to claim 1, wherein the step 2 comprises radically polymerizing a monomer, starting from the polymerization initiation points, in the presence of a reducing agent or an antioxidant by irradiation with LED light at 300 nm to 400 nm to grow polymer chains on a surface of the object to be modified.

6. The surface modification method according to claim 5, wherein the reducing agent or antioxidant is at least one selected from the group consisting of riboflavin, ascorbic acid, α-tocopherol, β-carotene, and uric acid.

7. The surface modification method according to claim 1, wherein, during or before the light irradiation, an inert gas is inserted into a reaction container and a reaction solution so that polymerization is performed in an atmosphere replaced with the inert gas, or vacuuming is conducted so that polymerization is performed in a system free from oxygen.

8. The surface modification method according to claim 1, wherein a compound to be used for the esterification or transesterification is at least one selected from the group consisting of alkyl alcohols, alkoxy alcohols, aromatic alcohols, and fluoro alcohols.

9. The surface modification method according to claim 1, wherein a compound to be used for the amidation is at least one selected from the group consisting of alkylamines, aromatic amines, fluoroamines, and amino group-containing silane compounds.

10. The surface modification method according to claim 1, wherein the monomer is at least one of an acrylic acid and a methacrylic acid.

11. The surface modification method according to claim 1, wherein the (liquid) monomer or a solution thereof contains a polymerization inhibitor, and the monomer is polymerized in the presence of the polymerization inhibitor.

12. The surface modification method according to claim 11,
wherein the polymerization inhibitor is 4-methylphenol.

13. The surface modification method according to claim 1,
wherein the polymer chains are 10 nm to 50000 nm in length.

14. A surface-modified elastic body, which is obtained by the surface modification method according to claim 1.

15. A surface-modified elastic body, which is required to have sliding properties in the presence of water or in a dry state, or have low friction in the presence of water or in a dry state, or have low water resistance in the presence of water or in a dry state, and which is obtained by the surface modification method according to claim 1.

16. A surface-modified elastic body, which is a three-dimensional solid having at least partially a surface modified by the surface modification method according to claim 1.

17. The surface-modified elastic body according to claim 14, which is a polymer brush.

18. A gasket for syringes, which has at least partially a surface modified by the surface modification method according to claim 1.

19. A catheter, which has at least partially a surface modified by the surface modification method according to claim 1.

20. A tire, which has at least partially a groove surface modified by the surface modification method according to claim 1.

* * * * *